US008160965B2

(12) United States Patent
Mishura

(10) Patent No.: US 8,160,965 B2
(45) Date of Patent: Apr. 17, 2012

(54) METHOD FOR PREVENTING ILLEGAL USE OF SOFTWARE

(75) Inventor: Sergii Mishura, Kiev (UA)

(73) Assignee: Sergii Mishura, Kiev (UA)

( * ) Notice: Subject to any disclaimer, the term of this patent is extended or adjusted under 35 U.S.C. 154(b) by 1300 days.

(21) Appl. No.: 11/762,051

(22) Filed: Jun. 12, 2007

(65) Prior Publication Data
US 2007/0300308 A1 Dec. 27, 2007

(30) Foreign Application Priority Data
Jun. 13, 2006 (CN) .......................... 2006 1 0092745

(51) Int. Cl.
G06Q 99/00 (2006.01)
(52) U.S. Cl. ....................................................... 705/59
(58) Field of Classification Search .................. None
See application file for complete search history.

(56) References Cited

U.S. PATENT DOCUMENTS

| | | | | |
|---|---|---|---|---|
| 5,790,664 A * | 8/1998 | Coley et al. | ................... | 709/203 |
| 5,825,883 A * | 10/1998 | Archibald et al. | ............... | 705/53 |
| 5,892,900 A * | 4/1999 | Ginter et al. | ...................... | 726/26 |
| 5,933,497 A * | 8/1999 | Beetcher et al. | ................. | 705/59 |
| 6,006,328 A * | 12/1999 | Drake | ............................. | 726/23 |
| 6,101,606 A * | 8/2000 | Diersch et al. | ................... | 726/27 |
| 2002/0091645 A1* | 7/2002 | Tohyama | ........................ | 705/59 |
| 2002/0107809 A1* | 8/2002 | Biddle et al. | ..................... | 705/59 |
| 2002/0120578 A1* | 8/2002 | Sy | .................................... | 705/59 |
| 2002/0138441 A1* | 9/2002 | Lopatic | ............................ | 705/59 |
| 2004/0019565 A1* | 1/2004 | Goringe et al. | .................. | 705/59 |
| 2004/0203686 A1* | 10/2004 | Bahr | ............................. | 455/418 |
| 2004/0249763 A1* | 12/2004 | Vardi | .............................. | 705/59 |
| 2005/0289072 A1* | 12/2005 | Sabharwal | ...................... | 705/59 |
| 2007/0300308 A1* | 12/2007 | Mishura | .......................... | 726/27 |
| 2008/0140469 A1* | 6/2008 | Iqbal et al. | ......................... | 705/7 |
| 2008/0172312 A1* | 7/2008 | Synesiou et al. | ................ | 705/34 |
| 2008/0172574 A1* | 7/2008 | Fisher | .............................. | 714/25 |
| 2008/0294537 A1* | 11/2008 | Mishra et al. | .................... | 705/30 |
| 2011/0173109 A1* | 7/2011 | Synesiou et al. | ................ | 705/34 |

* cited by examiner

*Primary Examiner* — Andrew J. Fischer
*Assistant Examiner* — Jacob C. Coppola
(74) *Attorney, Agent, or Firm* — Fish & Richardson P.C.

(57) ABSTRACT

Apparatus, techniques and systems for preventing illegal use of software and other digital files based on operations of a data storage device controller in a computer or computer system. For example, a method for preventing illegal use of software includes: configuring a computer to use a data storage device controller to control use of each digital file stored on one or more data storage devices; before a use of each digital file, operating the data storage device controller to access a storage device on which the digital file is stored to check whether the digital file meets a condition for use; and operating the data storage device controller to block use of the digital file when the condition is not met and to allow execution of the digital file when the condition is met. The digital file can be an application software or other digital documents.

3 Claims, 7 Drawing Sheets

METHOD FOR PREVENTING ILLEGAL USE OF SOFTWARE

PRIORITY CLAIM

This application claims the benefits and priority from Chinese Patent Application No. 200610092745.0 filed on Jun. 13, 2006, which is incorporated by reference as part of the specification of this application.

TECHNICAL FIELD

The present invention relates to computer and electronic fields, more particularly, to a method for preventing an illegal use of software.

Software is computer instructions or data. Anything that can be stored electronically is software All software stored on a storage device must be in a file or several files.

The present invention performs the control of launch, execution, termination, opening, editing, copying, moving, etc. of all types of files which can be stored on data storage device with hardware.

Therefore even if the user illegally breaks (cracks) the various copy-protection and registration techniques being used to protect current file or files, by modifying the files which are involved in protection procedure, the illegal use of the current file can still be directly prevented by the hardware.

BACKGROUND

With the progress of the computer technology, more and more applications software are developed to process sophisticated operations including calculation, graphic rendering, audio synthesis, etc., as well as developed a lot of corresponding file types, like multimedia files, text files, etc.

It has already used many methods to prevent the illegal use of the content protected files and commercial software. However, hereto, each of the protection methods has its own drawbacks, so some users can illegally use software by cracking.

The term "Cracking" means breaking the various copy-protection and registration techniques being used.

It is understood by those skilled in the art that the proposed protection way can be used to protect any files which can be stored on data storage device, like:

Data files,
Program Files:
Applications software files.
Systems software files.

The applications software will be used as a sample to explain proposed protection method. Applications software includes programs that do real work for users. For example, word processors, spreadsheets, and database management systems fall under the category of applications software.

FIG. 5 shows a conventional method for protecting applications software. After obtaining an applications software, the user installs files associated with it on a data storage device 3. As used herein, the data storage device 3 includes any devices able to store digital data therein such as hard disk, compact disk (CD), digital versatile disk (DVD), floppy disk, magnetic tape, flash memory, network memory, etc., and all devices which can be a source to launch and execute the applications software 2. Various files 2 of the installed applications software are in an unprotected state. The user can crack the applications software 2 through a crack program 1, so that the contents for preventing illegal use of applications software files will be modified to achieve an object of illegal use of the software. After modifying the files of applications software 2 so as to release a software protection, the user can execute this applications software through an operation system 4 (for example, Windows°, Linux, Unix). Specifically, the operation system 4 sends instructions to a data storage device controller 5 mounted on a motherboard 6 and operation system 4 can read and execute the files of applications software 2 stored on the data storage device 3. Since the internal protection of this application program has already been removed by the cracking program 1, this application program regards this user as a legal user, and performs its functionalities under the operation system 4. As it can be seen, the crack program 1 can freely remove limitations on the execution of the applications software 2 by modifying the files of applications software 2. Therefore, internal self protection of the applications software can not effectively prevent the illegal use of the applications software.

FIG. 6 shows another conventional method of the protection of applications software. Similar to the method shown in FIG. 5, after obtaining an applications software, the user installs files associated with it on the data storage device 3. At the same time, a dedicated protection software program 7 is also installed on the data storage device 3 for providing a protection against illegal use of the installed applications software 2. However, the dedicated protection software program 7 and an operation system 4 are still in an unprotected state. The user can modify the files of dedicated protection software program 7 and the files of operation system 4 through a crack program 1, so that the contents for preventing illegal use of these files are modified to achieve an object of illegal use of the software. The result of the cracking of the dedicated protection software program 7 and the operation system 4 is a release of the protection of the dedicated protection software program 7 to the applications software 2. The user can execute this applications software through the operation system 4. Specifically, the operation system 4 sends instructions to a data storage device controller 5 mounted on a motherboard 6 and operation system 4 can read and execute the files of applications software 2 stored on the data storage device 3. Since the external protection by the dedicated protection software program 7 has already been removed by the crack program 1, the dedicated protection software program 7 regards this user as a legal user, and the applications software performs its functionalities under the operation system 4. As it can be seen, the crack program 1 can freely remove limitations on the execution of the applications software 2 by modifying the files of the applications software 2, the files of dedicated protection software program 7 and the files of operation system 4. Therefore, the protection which is provided by dedicated protection software can not effectively prevent the illegal usage of applications software.

FIG. 7 shows another conventional method for protecting the applications software. This method uses a hardware control unit "Watchdog" to provide the protection. Similar to the method shown in FIG. 5, after obtaining an applications software, the user installs files associated with it on the data storage device 3. When the applications software is executed, this program sends an instruction to read the Watchdog 8 and receives a corresponding return value from the Watchdog 8. If the return value is correct, then the software is considered to be legally used, otherwise, if the return value is incorrect, then the software is considered to be illegally used and is terminated. However, since various files 2 of the installed applications software and the files of operation system 4 are in an unprotected state, the user can modify the files of applications software 2 and the files of operation system 4 through a crack program 1, so that the contents for preventing illegal use of these files are modified to achieve an object of illegal use of the software. After modifying the applications software files 2 and the files of operation system 4, the user can execute this applications software through the operation system 4. Specifically, the operation system 4 sends instructions to a data storage device controller 5 mounted on a motherboard 6 and operation system 4 can read and execute the applications software 2 stored on the data storage device 3. Since the internal protection of the application program has already been removed by the crack program 1 and the applications software no longer reads the watchdog 8, or the operation system 4 performs interceptions when the applications software reads the watchdog 8 and a correct value is returned, the applications software regards this user as a legal user, and performs its functionalities under the operation system 4. As it can be seen, the crack program 1 can freely remove limitations on the execution of the applications software 2 by modifying the files of applications software 2 and the files of operation system 4. Therefore, a protection to the software by means of the watchdog 8 can not effectively prevent user's illegal use of the applications software.

As it can be seen from FIGS. 5, 6 and 7, there are some protected files and some files involved in the protection procedure for protecting the protected files. Both of types of the files are always in a unprotected state and thus can be illegally modified to remove software protection.

In general, FIGS. 5, 6, 7, show that there exist some basic problems in software protection—software is protected by the same or other software, which can be cracked as soon as its files are installed on hard drive of current PC. It is obvious, that above mentioned problems are true for all kinds of software like data files and program files.

SUMMARY OF INVENTION

Therefore, considering the above problems, the present invention provides a method for preventing illegal use of software. The present invention controls launch, execution, termination, opening, editing, copying, moving, etc. of all types of files which can be stored on data storage device with hardware.

Therefore even if the user illegally breaks (cracks) the various copy-protection and registration techniques being used by modifying the files which are involved in protection procedure, the illegal use of the current software can still be directly prevented by the hardware.

As it was mentioned before, applications software will be used as a sample to explain proposed file protection method.

According to the present invention, a method for preventing illegal use of applications software is provided. The method comprises the steps of:

Checking, by a data storage device controller, whether the applications software is properly installed and not illegally modified on a data storage device;

Blocking, by the data storage device controller, a launch of the applications software, if the applications software is not properly installed or illegally modified on the data storage device;

Checking, by the data storage device controller, whether the applications software has to be paid for use, if the applications software is properly installed and not illegally modified on the data storage device;

Allowing the user to use the applications software normally, if the applications software is free for use;

Checking, by the data storage device controller, whether a user has already performed a payment process, if the applications software has to be paid for use;

Blocking, by the data storage device controller, the launch of the applications software, if the user does not perform the payment process;

Determining an available time period of the applications software usage for each user of the current personal computer in a case the user has already made the payment, and allowing the user to use the applications software normally;

Prompting the user to perform the payment process once more in a case of the used time period longer than the determined available time period; and Terminating, by the data storage device controller, an execution of the applications software, if the user does not perform the payment process in time.

Preferably, the step of checking whether the applications software is properly installed and not illegally modified may be done by two ways:

Checking the files of applications software during its installation process; and/or Checking the files of the already installed applications software before the applications software will be paid.

Advantageously, the checking of the installation process of applications software can prevent any harmful modifying of any files which are already installed on data storage device.

At present time, security certificates are used by software developers and vendors in Internet TO CONFIRM THE SOURCE from which user downloads and installs some files.

Preferably, any software developer, which does not produce computer viruses or any other harmful software, and which provides above mentioned security certificates can be registered as recognized software developer. The term "software from unrecognized software developers" means software which is created by some unregistered developer, user of current PC, other users, etc.

Preferably, the data storage device controller will dedicate and manage two dedicated area on the data storage device, in which a first dedicated area (PRAR) is used for software from the recognized software developer and has two sub-dedicated area, a first sub-dedicated area (PRAR 1) and a second sub-dedicated area (PRAR 2), and a second dedicated area (UNAR) is used for software from unrecognized software developers.

Specifically, the data storage device controller will dedicate and manage two areas on data storage device:

A dedicated area for the installing of unrecognized developer's software will be referred as "unprotected area"—UNAR.

A dedicated area for the installing of recognized developer's software will be referred as "protected area"—PRAR and contains two areas:

PRAR 1—temporary directory, which will be used for installation of the files of applications software during the checking where the applications software is properly installed and not illegally modified or not. PRAR 1 will be inaccessible for any software or devices except controller of data storage device.

PRAR 2 will contain the executable files of properly installed applications software after reinstallation from PRAR 1.

Preferably, if checking is performed during the installation process of the applications software, the step of checking whether the applications software is properly installed and not illegally modified comprises the following sub-steps:

Installing, by the data storage device controller, the applications software to the first sub-dedicated area (PRAR 1) of the data storage device;

Checking, by the data storage device controller, the data storage device to obtain detailed information about the installed applications software;

Obtaining, by the data storage device controller, detailed information about the applications software which is provided by a recognized software developer;

Comparing the detailed information obtained from the data storage device with the detailed information which is provided by the recognized software developer;

Determining that the applications software has been properly installed and not illegally modified on the data storage device if a result of the above comparison is that the obtained two pieces of detailed information are the same; otherwise, determining that the applications software is not properly installed or illegally modified on the data storage device if the result of the above comparison is that the obtained two pieces of detailed information are different; and Reinstalling, by the data storage device controller, the applications software from the first sub-dedicated area (PRAR 1) of the data storage device to the second sub-dedicated are (PRAR 2) or to the second dedicated area (UNAR) of the data storage device; otherwise, deleting, by the data storage device controller, the installed applications software from the first sub-dedicated area (PRAR 1) of the data storage device.

Preferably, the first and the second sub-dedicated areas (PRAR 1 and PRAR 2) will be kept encrypted by data storage device controller. It will be done by using any known or future encryption algorithms It must be so to avoid copying, moving, etc. of files of the protected applications software in case current PC or data storage device controller are turned off.

Preferably, the step of checking whether the already installed applications software is properly installed and not illegally modified comprises the following sub-steps:

Checking, by the data storage device controller, the data storage device to obtain detailed information about the installed applications software;

Obtaining, by the data storage device controller, detailed information about the applications software which is provided by a recognized software developer;

Comparing the detailed information obtained from the data storage device with the detailed information which is provided by the recognized software developer; and Determining that the applications software has been properly installed and not illegally modified on the data storage device if a result of the above comparison is that the obtained two pieces of detailed information are the same; otherwise, determining that the applications software is not properly installed or illegally modified in the data storage device if the result of the above comparison is that the obtained two pieces of detailed information are different.

Preferably, the data storage device controller obtains the detailed information about the applications software provided from a recognized software developer by means of credit cards, debit cards, smart cards, IC cards, Internet or networks.

Preferably, the data storage device controller controls directly all devices which are used to obtain the detailed information about the applications software provided from a recognized software developer by means of credit cards, debit cards, smart cards, IC cards, Internet or networks.

Preferably, the data storage device controller will independently process the obtaining of the detailed information about application software by using credit cards, debit cards, smart cards, IC cards, Internet or networks, etc., without involving of any systems or applications software.

Preferably, the detailed information is always encrypted, especially when the detailed information is transmitted through Internet or networks.

Present invention will use detailed information about the applications software to check current installation pack and already installed applications software files to avoid cracking of it.

This detailed information will be provided by a recognized software developer cooperatively or additionally to security certificate.

It is understood by those skilled in the art that security certificates CONFIRM THE VALIDITY OF SOURCE; and the detailed information about the applications software CONFIRM VALIDITY OF CONTENT.

Preferably, the step of determining the available time period of the applications software comprises following sub-steps:

Gathering information about a usage level of the applications software;

Determining whether the current usage level of the applications software is higher than a basic usage level predetermined by a software developer or a vendor;

Determining the available time period on the basis of a fee paid by the user and a first price, if the usage level is not higher than the predetermined basic level; and Determining the available time period on the basis of a fee paid by the user and a second price, if the usage level is higher than the predetermined basic level.

Preferably, the usage level of the applications software is determined according to at least one of:

total usage time period;

daily usage time period;

total amount of input information;

total amount of processed information;

used features of the applications software.

Preferably, in case the total or daily usage time period is longer than a predetermined basic time period, it is determined that the usage level of the applications software is higher than the predetermined basic usage level; or in a case where the total amount of inputted information is more than a predetermined basic information amount, it is determined that the usage level of the applications software is higher than the predetermined basic usage level; or in a case where the total amount of processed information is more than a predetermined basic information amount, it is determined that the usage level of the applications software is higher than the predetermined basic usage level; or in a case where a special feature of the applications software is used, it is determined that the usage level of the applications software is higher than the predetermined basic usage level.

Advantageously, the price and other information which will be used to determine time available period for each user of the PC to use protected applications software, will be defined by its developer, owner or vendor, and depend on types, available features, etc. of the protected applications software which can not be fully described according to the current common example of the applications software but can be easily realized by those skilled in the art.

Preferably, the first and the second prices are obtained by means of credit cards, debit cards, smart cards, IC cards or networks.

Preferably, information related to the first and the second prices is always encrypted, especially when the information related to the first and the second prices is transmitted through networks.

Preferably, data storage device controller will check all files which are preinstalled or will be installed on data storage device.

Preferably, will be used some control file format, for example: *.cff. It is a sample of some general file format which must be used for distribution of protected files. Of course, it can be any other newly created file format and the present invention is not limited thereto.

Preferably, if a developer wishes that his software (files) will be protected, he will convert it into *.cff format before he releases this software for public usage.

Preferably, the invented method further includes, before the step of checking whether the applications software is properly installed and not illegally modified:

converting, by the data storage device controller, *.cff files into its original file formats; and enabling the installation to begin to the first sub-dedicated area (PRAR 1) for the recognized software developer.

Preferably, the developer also will distribute the detailed information about software (files) so it will be available through networks (such as Internet, LAN, WAN) or from any other available sources (such as credit cards, debit cards, IC cards etc.). When it is transmitted through networks, the transmitted information may be encrypted by using any known or future encryption algorithms so as to prevent the transmitted detailed information from hacking during the network transmission.

Preferably, the files which are not protected can be distributed in its usual format, like *.exe, *.bat, *.com, script files, *.txt, *.doc, *.wav, etc.

Preferably, the converting into and from *.cff format will be standardized. The converting into and from *.cff format must be processed by data storage device controller only.

Preferably, during the converting of any types of files into *.cff format, the data storage device controller will add digital watermarking to newly created *.cff files.

Preferably, any operations like opening, editing, copying, moving, etc. of *.cff files will be processed by data storage device controller only. It must be so to avoid any illegal action (cracking) which can be applied to *.cff files.

Preferably, any operations like opening, editing, copying, moving, deleting, etc. of any files will be processed by data storage device controller only.

Preferably, in a case the user wants to install some patch to update applications software on the second sub-dedicated area (PRAR 2) or the second dedicated area (UNAR), the patching will be performed by the same way as common installation of the any other applications software. Next time when applications software has to be paid, the controller will summarize information from recognized software developers and information of the last patching so that the payment will be allowed or not.

Preferable, the data storage; device controller will realize some strong restrictions to software installed on the second dedicated area (UNAR)—it must have no any access to the first and the second sub-dedicated areas (PRAR 1 and PRAR 2).

Preferably, the data storage device controller controls activity of data storage devices and all devices which can be a source from which can be launched and executed the applications software: hard disk, compact disk (CD), digital versatile disk (DVD), floppy disk, magnetic tape, flash memory, ZIP disk, network memory, etc.

Preferably, the data storage device controller controls activity of all devices, such as card reader, etc., which will be used by user to perform the payment with credit cards, debit cards, smart cards, etc.

Preferably, the data storage; device controller will independently perform the payment by using credit cards, debit cards, smart cards, etc., without the involving of any systems or applications software.

Preferably, the data storage device controller is an integrated important constitutive element of the motherboard, once it is illegally replaced or intruded, the computer motherboard will be broken down.

Preferably, the data storage device controller activity is independent from any other device or software and it controls directly all devices which can be a source to launch and execute the applications software.

According to the present invention, the data storage device controller will let launch the applications software which is properly installed and not illegally modified but is not paid in case it has not to be paid according to USER LICENSE AGREEMENT. The payment details have to be provided together with detailed information about applications software by the recognized software developer or vendor.

Preferably, the user performs the payment process in an off-line payment manner or in an on-line payment manner.

As it was mentioned before, applications software is used as a sample to explain proposed file protection method.

The method for preventing illegal use of applications software according to the present invention controls the launch and execution of the applications software and performs termination of the applications software with the data storage device controller. Therefore even if the user illegally breaks (cracks) the various copy-protection and registration techniques being used to protect current applications software, by modifying the files which are involved in the protection procedure, the illegal use of the applications software can still be directly prevented by the data storage device controller.

Specifically, the present invention provides a method for preventing illegal use of any files. The present invention controls launch, execution, termination, opening, editing, copying, moving, etc. of all types of files which can be stored on data storage device with hardware.

Therefore even if the user illegally breaks (cracks) the various copy-protection and registration techniques being used to protect current files, by modifying the files which are involved in the protection procedure, the illegal use of the current files can still be directly prevented by the hardware.

Here, the term "software" means anything that can be stored electronically. All software stored on a storage device must be in a file or several files. Software is often divided into two categories: data and programs.

Data is distinct pieces of information, usually formatted in a special way. Data can exist as bits and bytes stored in electronic memory.

Programs:

Applications software includes programs that do real work for users. For example, word processors, spreadsheets, and database management systems fall under the category of applications software.

Systems software includes the operating system and all the utilities that enable the computer to function files.

Here, the term "illegal use" means usage of the software without a permission of its developer or its owner or its vendor, and/or involved PC user, which infringes copyrights, violates patents or intellectual property rights or breaks any other law; or which damages files or inflicts losses on anybody.

Therefore, this application describes apparatus, techniques and systems for preventing illegal use of software and other digital files based on operations of a data storage device controller in a computer or computer system. For example, a method for preventing illegal use of a digital file includes: operating a data storage device controller in a computer to control use of a digital file stored on one or more data storage devices; before a use of the digital file, operating the data storage device controller to access a storage device on which the digital file is stored to check whether the digital file meets a condition for use; and operating the data storage device controller to block the use of the digital file when the condition is not met and to allow use of the digital file when the condition is met. The digital file can be an application software or other digital documents. The use of the digital file can include various operations associated with digital files, e.g., opening, editing, copying, moving, deleting and modifying an installed file, or launching or executing an application software.

For another example, a computer device configured for preventing illegal use of software is described to include: one or more data storage devices on which at least one operating system and at least one digital file are installed; a data storage device controller in communication with and operable to control execution of each digital file stored on the one or more data storage devices. Before use of each digital file, the data storage device controller is configured to check whether the digital file is properly installed or is illegally modified, and block the use of the digital file when the digital file is not properly installed or illegally modified. The digital file can be an application software or other digital documents. The use of the digital file can include various operations associated with digital files, e.g., opening, editing, copying, moving, deleting and modifying an installed file, or launching or executing an application software.

For yet another example, a computer program product for preventing illegal use of a digital file is described. This product is encoded on one or more computer-readable media and operable to cause data processing apparatus to perform at least the following operations: using a data storage device controller to control use of each digital file stored on one or more data storage devices; before a use of each digital file, operating the data storage device controller to access a storage device on which the digital file is stored to check whether the digital file meets a condition for use; and operating the data storage device controller to block execution of the digital file when the condition is not met and to allow use of the digital file when the condition is met.

These and other embodiments, their operations and associated advantages are described in various implementations in greater detail in the drawings, the description and the claims.

DETAILED DESCRIPTION

Now, the present invention will be described in conjunction with the accompanied drawings. It has to be noted that the embodiments described in detail are for illustration only, not limitations to the protection scope of the present invention.

The method of the present invention will be described in detailed as referring to FIGS. 1-4 in the following. Same or similar components are denoted with same reference signals throughout the drawings.

Figure 4:
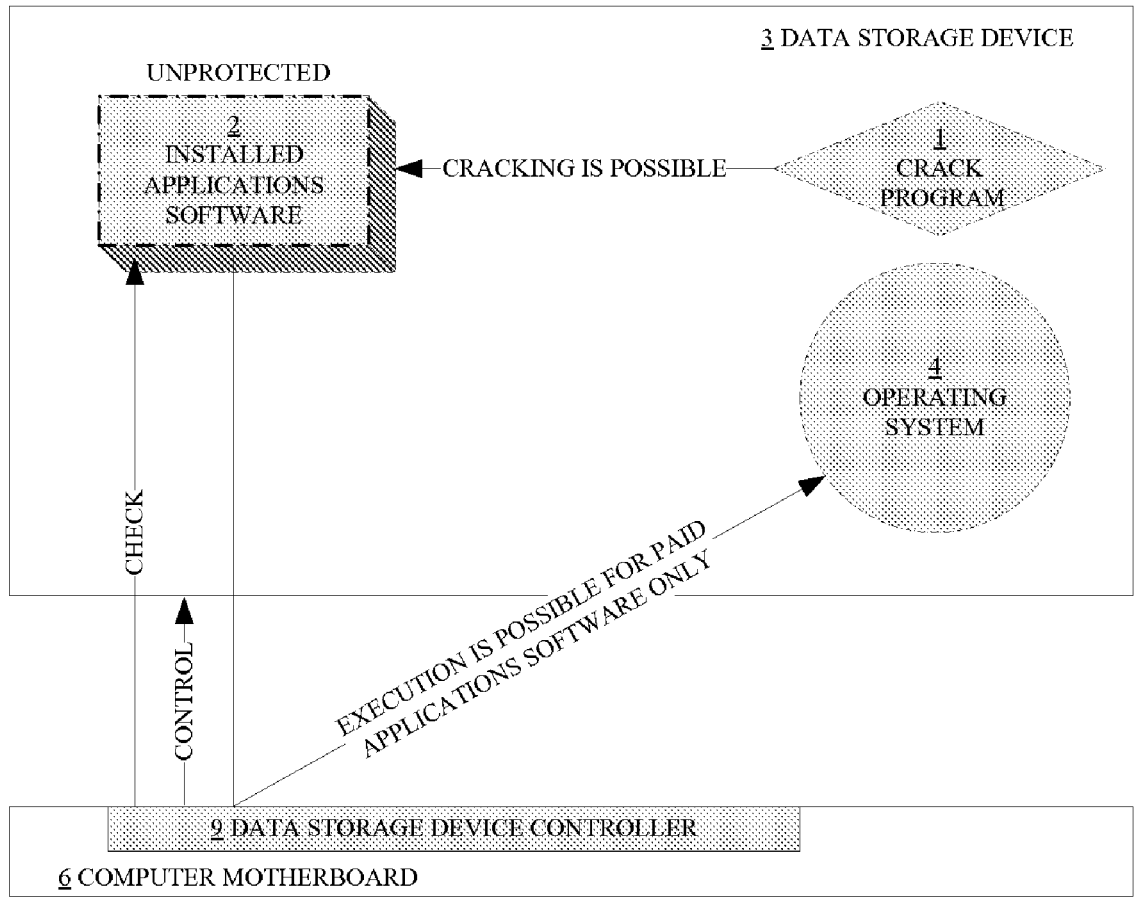
FIG. 4 is a system block diagram for illustrating the operation principles of the method according to the present invention.

FIG. 4 is a system block diagram for illustrating the operation principles of the method according to the present invention. Referring to FIG. 4, in the present invention, a data storage device controller') integrated on a computer motherboard 6 is modified and upgraded so, that during its operation, in addition to the control of data storage device 3, the data storage device controller 9 performs a check of the files of an installed applications software 2 on the data storage device 3. Specifically, in the present invention, the data storage device controller 9 performs functionalities of the controllers of the following hardware: hard disk driver, CD-ROM, DVD-ROM, flash memory, ZIP driver, etc., and it performs the control of the activity of all other devices which can be a source of the files to launch and execute the applications software 2. And, the data storage device controller 9 further determines the available time period for each PC user by gathering and calculating some specific information, which will be described in detail later.

It is understood by those skilled in the art that the above hardware is only examples of devices and the innovation of the present invention can be applied to various existing and future devices which can be a source to launch, execute, terminate, open, edit, copy, move, etc. all types of files. Moreover, the data storage device controller 9 further controls a device for performing off-line/on-line payment. For example, the device for performing off-line/on-line payment includes, but is not limited to, credit card, debit card, smart card, IC card and the like. For simplicity, in the following description, the present invention is described by using the smart card as the example. However, such description is not intended to limit the scope of the present invention.

The detailed contents about common disk drive controller can be found from the web site address: http://www.webopedia.com/TERM/D/disk-controller.html. In personal computers, the controllers are often single chips for controlling the bidirectional communications between the computer and peripheral devices. When a computer is purchased, all necessary controllers for standard components such as display screen, keyboard and disk drives are already equipped therewith. If an additional device is attached, however, a new controller is needed to be inserted therein. The controller must be designed to communicate with the computer's expansion bus. There are three standard bus architectures for PCs—AT bus, PCI (Peripheral Component Interconnect) and SCSI (Small Computer Systems Interface). When a controller is purchased, therefore, it must be ensured that the controller conforms to the bus architecture that the computer uses.

Figure 5:
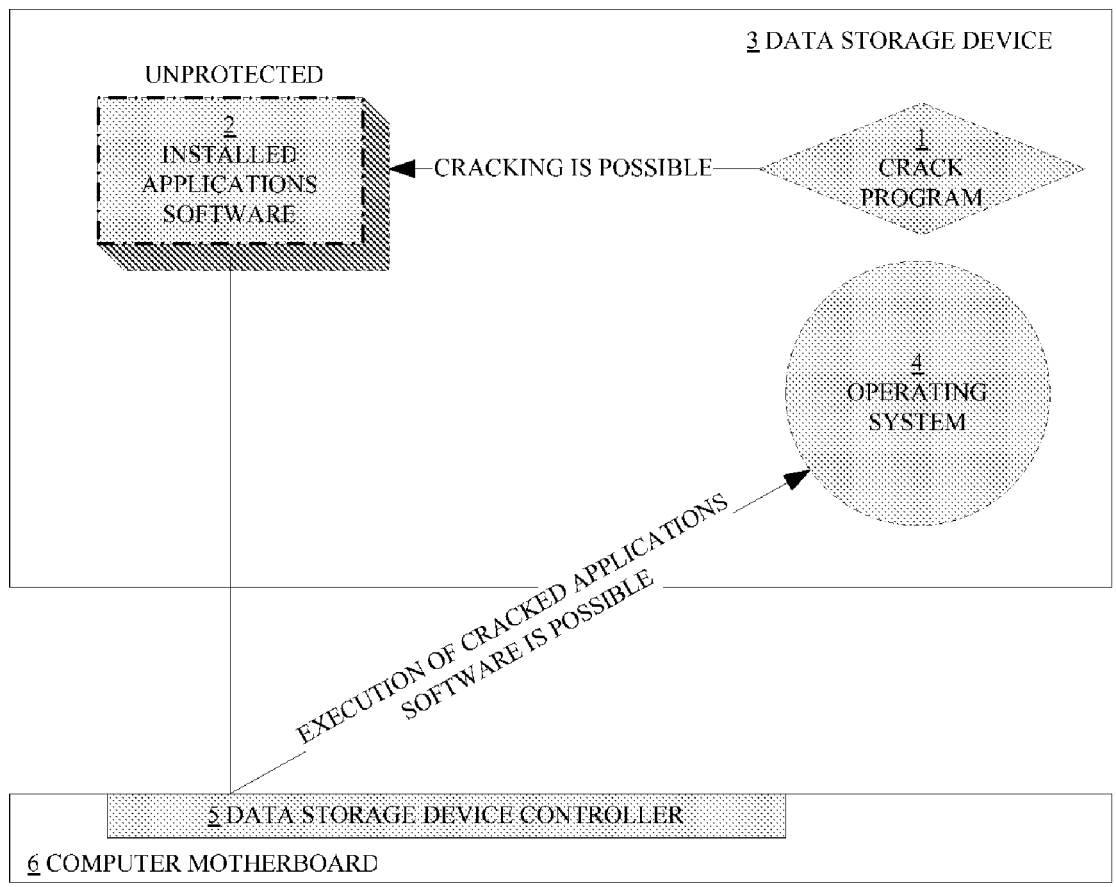
FIG. 5 is a system block diagram for illustrating a conventional method for protecting an applications software program.
Figure 6:
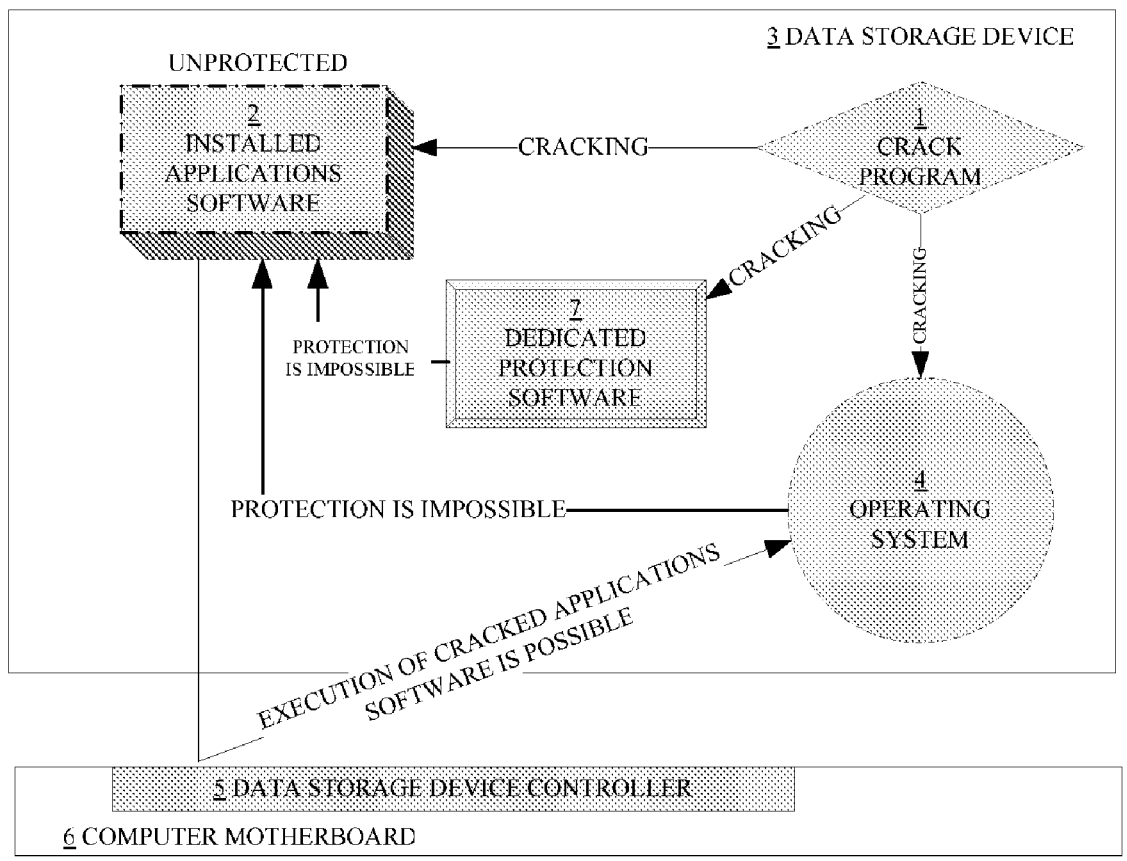
FIG. 6 is a system block diagram for illustrating another conventional method for protecting an applications software program.
Figure 7:
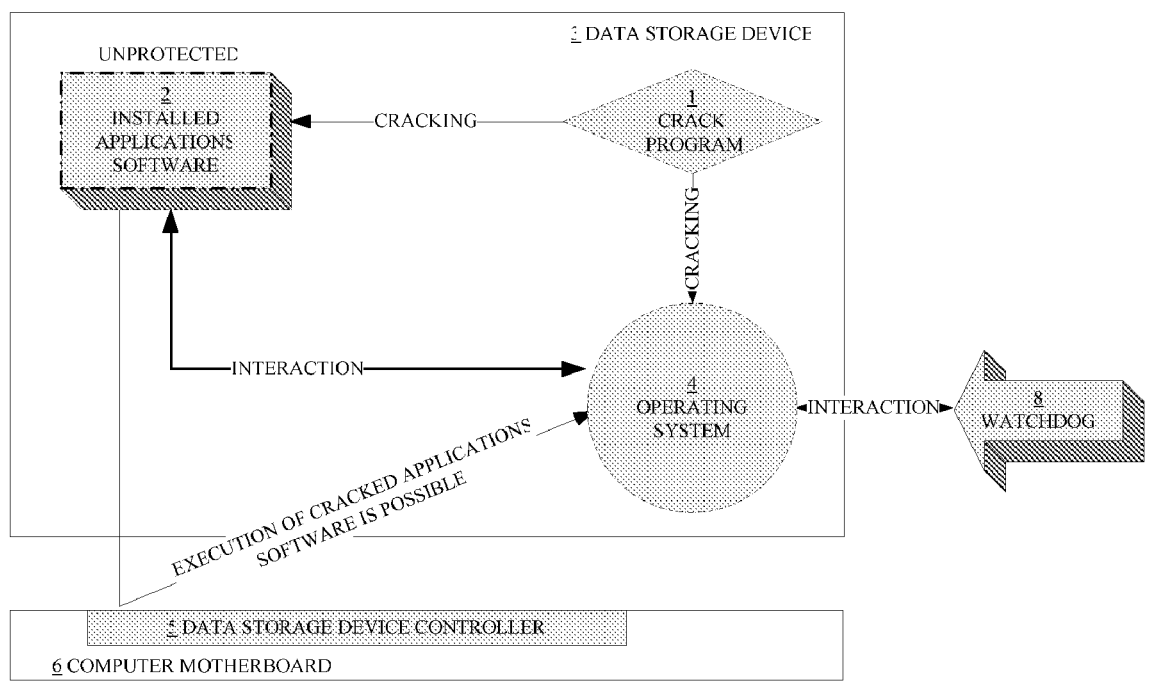
FIG. 7 is a system block diagram for illustrating still another conventional method for protecting an applications software program.

In an exemplary situation of the present invention as shown in FIG. 4, similar to that as shown in FIG. 5, after obtaining applications software the user installs files associated with it on to the data storage device 3. As used herein, the data storage device 3 means any devices which can be a source of the files to launch and execute the applications software such as hard disk, compact disk (CD), digital versatile disk (DVD), floppy disk, magnetic tape, flash memory, network memory etc. Various files of the installed applications software 2 are still in an unprotected state. The user can still make modifications to the files of applications software 2 through cracking program 1. However, before the applications software will be executed, according to the method of the present invention, the data storage device controller 9 will directly, without involving of the operating system 4 or any other software or hardware, check the files installed on the data storage device 3. When it finds that the installed applications software is a protected software, the data storage device controller 9 will directly, without involving of the operating system 4 or any other software or hardware, check whether the protected applications software is properly installed and not illegally modified or not. When it is found that the files are illegally modified or the applications software has to be paid, the launch and execution of the applications software will be blocked directly without involving of the operating system 4 or any other software or hardware. Therefore applications software is protected from hardware hierarchy. No matter how the user modifies the various files of the applications software 2, the files of dedicated protection software program 7 (for example, FIG. 6) or the files of operation system 4 (for example, FIG. 6), the check and the control of applications software initiated by the data storage device controller 9 can not be avoided at all.

It means that user must modify hardware to avoid proposed protection. And, since the data storage device controller 9 is an integrated important constitutive element of the motherboard, once it is illegally replaced or intruded, the computer motherboard will be broken down. Thus, the illegal use of software is prevented effectively.

Now, the method for protecting applications software programs according to the present invention will be described in details by reference to FIGS. 1-3.

Figure 1:
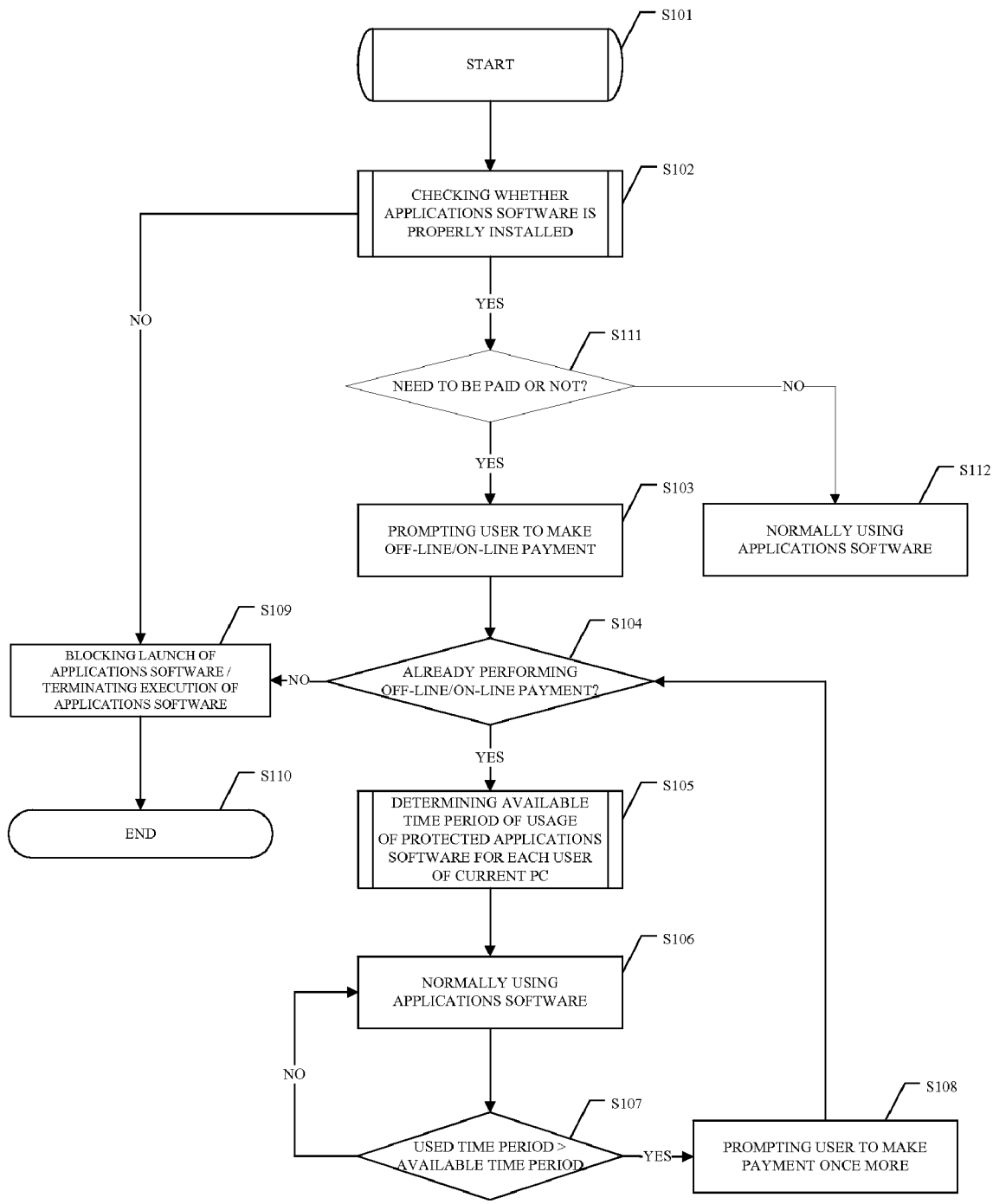
FIG. 1 is a flowchart of a method for preventing illegal use of applications software according to the present invention.

FIG. 1 is a flowchart of a method for preventing illegal use of applications software according to the present invention.

First of all, referring to FIG. 1, at Step S101, the data storage device controller 9 checks data streams flowing through the data storage device controller 9, when the user accesses the data storage device 3 through the operation systems 4 or other paths in order to execute the applications software 2 stored on the data storage device 3. The data storage device controller 9 firstly checks whether the user properly installs the protected applications software 2 at Step S102, and its detailed operation procedure is shown in FIG. 2.

Figure 2:
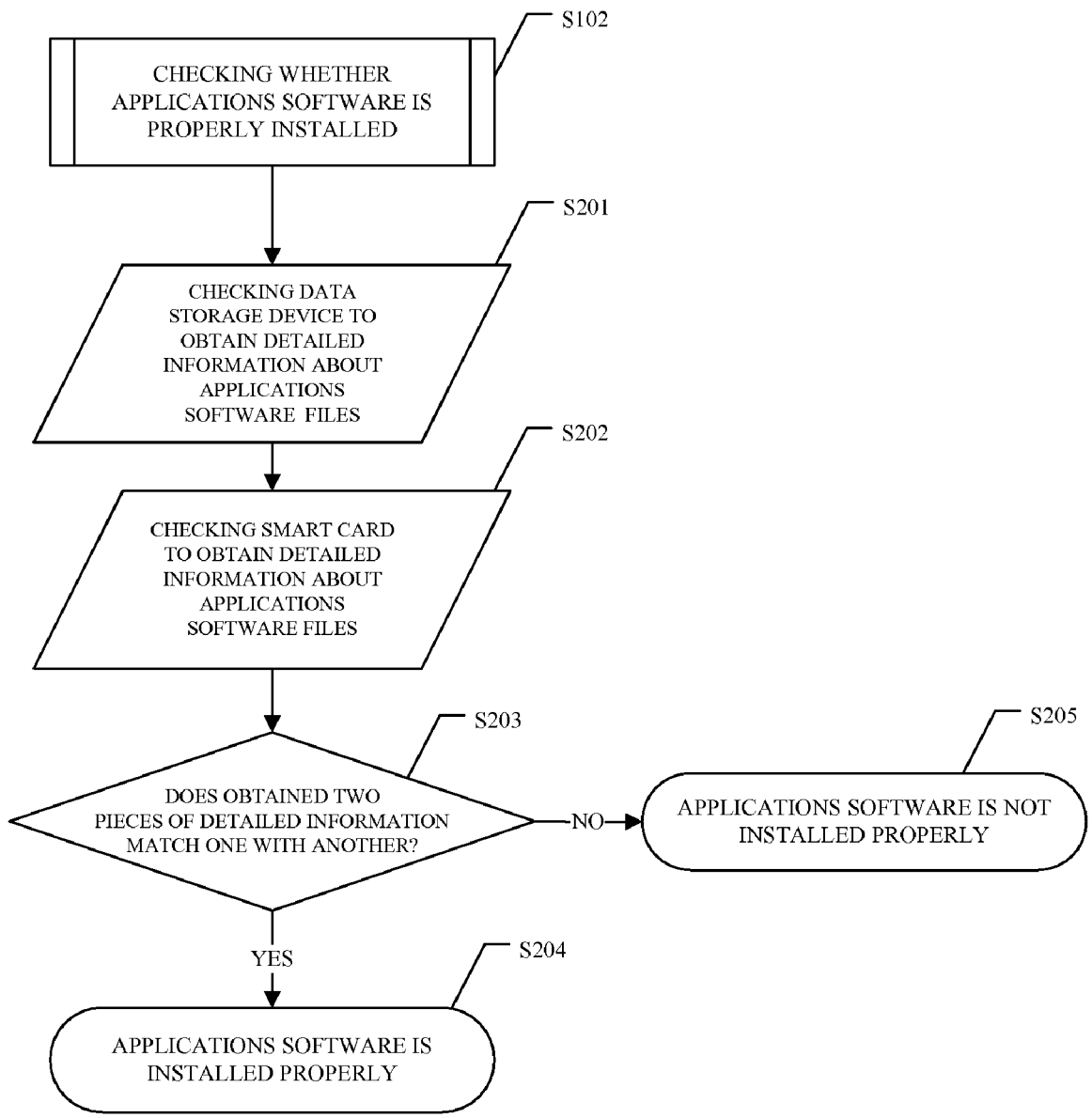
FIG. 2 is a flowchart showing a checking step S102 of the proper installation of an applications software as shown in FIG. 1.

FIG. 2 is a flowchart showing a checking step S102 of the proper installation of applications software as shown in FIG. 1.

Referring to FIG. 2, at Step S201, the data storage device controller 9 checks the data storage device 3 to obtain detailed information (special data) about the files of applications software 2 (gathers detailed information about the files of applications software 2 from the data storage device 3). The detailed information includes but is not limited to installation directory structure of the application, names of files, types of files, sizes of files, digital watermark marking, etc.

Digital watermarking means a pattern of bits inserted into a file that identifies the file's copyright information (author, rights, identification, etc.). Watermarking is also called data embedding and information hiding.

Once the user modifies the files of applications software 2 by using the crack program 1, the above information will be changed. At Step S202, the data storage device controller 9 then checks the smart card inserted in a smart card reader (not shown) to obtain detailed information about the files of applications software 2 provided by a recognized software developer. And, at Step S203, it judges whether the obtained two pieces of detailed information are same or not. If the detailed information obtained from the data storage device 3 matches with the detailed information obtained from the smart card, it is then determined at Step S204 that the protected applications software 2 is properly installed and not illegally modified; otherwise, it is determined at Step S205 that the protected applications software 2 is not installed properly.

The data storage device controller controls directly all devices which are used to obtain the detailed information about the applications software provided from a recognized software developer by means of credit cards, debit cards, smart cards, IC cards, Internet or networks.

The data storage device controller must independently process the obtaining of the detailed information about application software by using credit cards, debit cards, smart cards, IC cards, Internet or networks, etc., without the involving of any systems or applications software.

Every developer, which does not produce viruses or any other harmful software, can be a recognized developer free of charge. To implement the current invention, some organization will be established, for example, Software Developer Union, which will:
  keeps a list of the recognized software developers;
  performs recognition of the software developers by checking the safety of software before it will be released;
  keeps the information, which will be used by the data storage device controller 9 to check whether the current applications software is properly installed and not illegally modified or not;
  provides this information on-line; and
  provides this information on smart cards.

It is noted that the smart card is used only as an example herein. The data storage device controller 9 can acquire the detailed information about the files of applications software 2 provided from the recognized software developer through networks (such as Internet, LAN, WAN) or from any other available sources (such as credit cards, debit cards, IC cards etc.). When it is transmitted through networks, the transmitted information may be encrypted by using any known or future encryption algorithms so as to prevent the transmitted detailed information from hacking during the network transmission.

It has to be also noted that all the information described in the present document may be appropriately encrypted, especially when it will be transmitted through networks. All the encryption and decryption algorithms have to be known and easily implemented by those skilled in the art. Since the innovation of the present invention is not focusing on this aspect, the detailed descriptions about them are omitted.

Thus, software developers must provide the detailed information about the files of applications software 2 to be a recognized software developer and to perform the above judgment step S203. In case some recognized software developers want let users use applications software free of charge, they have to mark the software as free of charge software and provide this information together with the detailed information about the files of applications software 2.

Furthermore, the step S102 of checking whether the applications software is properly installed and not illegally modified may be done-by two ways. One is a checking which is has to be performed during the installation process of the applications software 2 on data storage device 3. The other one is a checking of files of applications software 2 which are already installed on data storage device 3. The second way of checking must be performed before applications software: 2 will be paid, which has already been described referring to FIG. 2.

The data storage device controller 9 must dedicate and manage two areas on data storage device 3 (not shown in drawings):

A dedicated area for the installing of unrecognized developer's software referred as "unprotected area"—UNAR. UNAR must operate as today the common data storage devices operate. It means that patching, editing, etc., of software (files) on the UNAR can be done by patch from any software developers or user. Of course, all software will be checked to avoid illegal usage of it. In a case where the data storage device controller recognizes some protected software, it will block this patching procedure.

A dedicated area for the installing of recognized developer's software referred as protected area"—PRAR. Patching, editing, etc. to the software on the PRAR are available to the user according to made payment and software license. It means that patching, editing, etc., of software (files) on the UNAR can be done by patch from recognized software developers only. PRAR will contain two areas:

PRAR 1—temporary directory, which will be used for installation of the files of applications software: during the checking where the applications software is properly installed and not illegally modified or not. PRAR 1 has to be inaccessible for any software or devices except controller of data storage device.

PRAR 2 will contain the executable files of properly installed applications software after reinstallation from PRAR 1.

Now, the procedure to perform checking during the installation process of the applications software will be described in further detailed. The data storage device controller 9 performs installation of the applications software to PRAR 1 of the data storage device 3. The data storage device controller 9 then checks whether the applications software is properly installed and not illegally modified or not (according to the steps shown in FIG. 2A). If the checking is successful, the data storage device controller 9 performs reinstallation of applications software from the PRAR 1 to PRAR 2 for software from recognized developer or to original directory of the UNAR for software from unrecognized developer (for example, C:\Program files\ . . . or D:\Program files\ . . . , etc.). Otherwise, the data storage device controller 9 will delete the files of installed applications software from the PRAR of the data storage device 3 in case the checking is unsuccessful.

In general, PRAR and installed files (software) on PRAR must be encrypted by using any known or future encryption algorithms. This encryption must be done by data storage device controller 9. The encryption prevents illegal copying, moving, and other operations of the protected software (files) to/from other data storage devices or to/from UNAR in case current PC or data storage device controller 9 are turned off. All the encryption and decryption algorithms will be known and easily implemented by those skilled in the art. Since the innovation of the present invention is not focusing on this aspect, the detailed descriptions about them are omitted.

As compared with an antivirus application, the inventive method is different in the following aspects. Firstly, the antivirus application is software, whereas the data storage device controller 9 is independent hardware with its own software installed inside. Of course, some special antivirus software can also be installed into the data storage device controller 9. Secondly, the antivirus application tries to find well-known viruses, but the data storage device controller 9 strongly confirms sources and contents by comparing the information from the data storage device 3 with the information received from the recognized software developer or vendor. Thirdly, the antivirus application checks installation process in the operation system environment, whereas the data storage device controller 9 will perform it independently without any involving of the operation system and any other software. Fourthly, the antivirus application checks files one by one, whereas the data storage device controller 9 checks all files together.

Returning to FIG. 1, if it is determined at Step S102 that the protected applications software 2 is not properly installed or illegally modified, it then proceeds to Step S109, blocking the launch of the protected application program and displaying an error message, and then it terminates at Step S110. On the other hand, if it is determined at Step S102 that the protected applications software 2 is properly installed and not illegally modified, it then goes to Step S111 to determine whether the software developer wants his software to be paid or not. Whether the software developer wants his software to be paid or not may be determined by a flag recorded in the smart card together with the provided by him detailed information about the files of the applications software, or by any other secure and safety way. When it is transmitted, the transmitted information may be encrypted by using any known or future encryption algorithms so as to prevent the transmitted detailed information from hacking.

It will also be noted that all the information described in the present document may be appropriately encrypted. All the encryption and decryption algorithms will be known and easily implemented by those skilled in the art. Since the innovation of the present invention is not focusing on this aspect, the detailed descriptions about them are omitted.

If it is determined at Step S111 that the software developer would like to provide his applications software 2 free of charge, it then proceeds to Step S112 and the user is allowed to use the properly installed and not illegally modified applications software 2 normally. If it is determined at Step S 111 that the usage of the software has to be charged, it then goes to Step S103 to prompt the user to make an off-line/on-line payment. And then, it is determined at Step S104 whether the user has already performs the off-line/on-line payment or not. The user may make his off-line/on-line payment with credit card, debit card, smart card, IC card and so on.

When it is determined that the user does not perform a payment process ("No" in Step S104), it proceeds to Step S109 to block the launch of the protected applications software and to display an error message, and then it is terminated at Step S 110. On the other hand, when it is determined that the user already performs a payment process ("Yes" in Step S104), it then goes to Step S105. The available time period of usage of protected application 2 for each user of the PC is determined at Step S105, and its detailed operation procedure is shown in FIG. 3.

Figure 3:
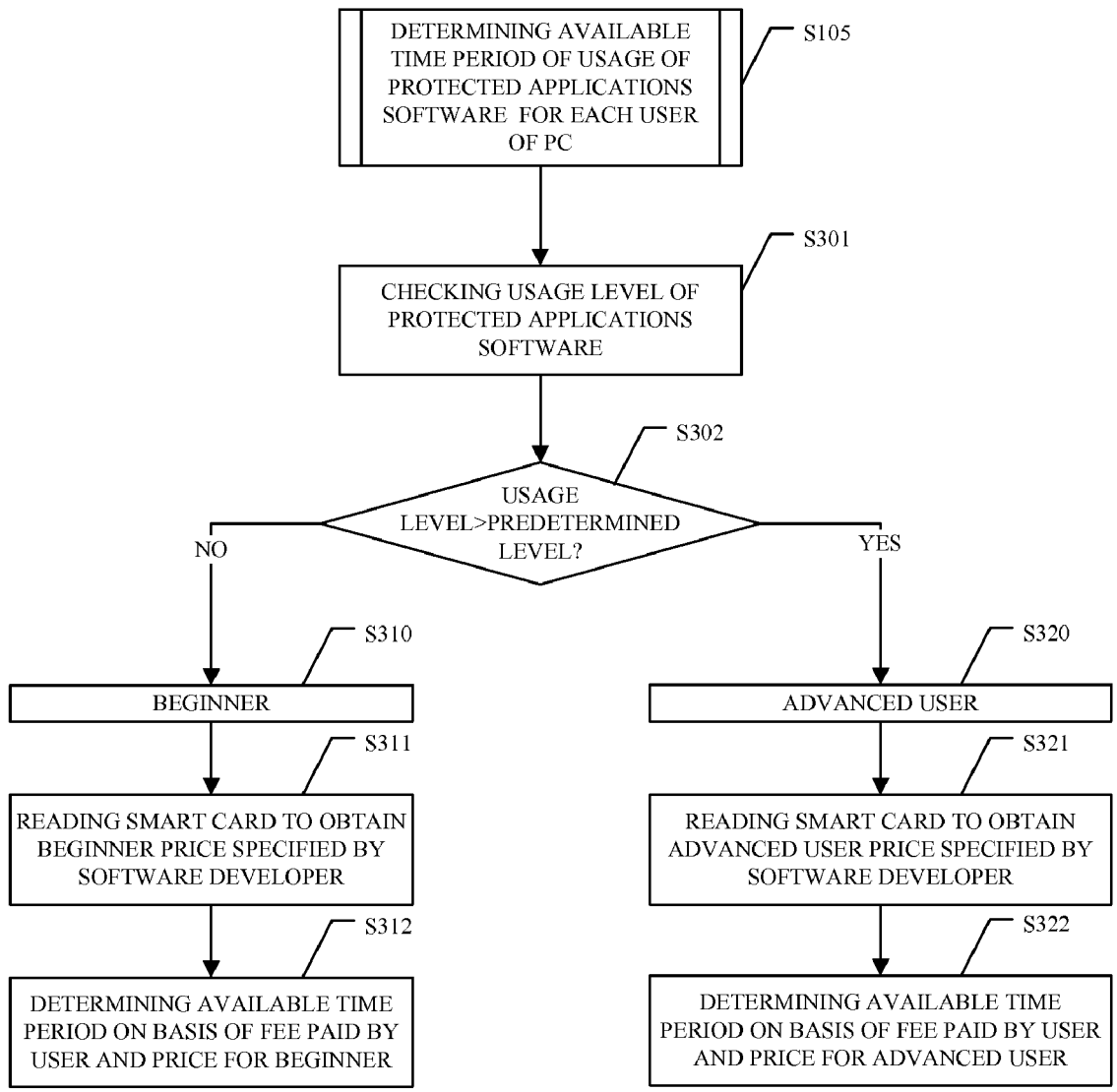
FIG. 3 is a flowchart showing a determining step S105 of the available time period as shown in FIG. 1.

FIG. 3 is a flowchart showing a determining step 105 of the available time period as shown in FIG. 1.

Referring to FIG. 3 at Step S301, a usage level of the protected applications software program 2 is checked firstly. The usage level of the protected application program 2 can be calculated through the following processes: 1) summing up the usage time period of this applications software; 2) summing up all the information which is input and processed by this applications software per an hour; and 3) counting all kinds of features (functions) of this applications software which are used by the user.

Next, at Step S302, it is judged whether the usage level of the applications software 2 is higher than a predetermined usage level. For example, if a usage time period of the user's using of this applications software is more than a predetermined time period, then it is determined that the usage level of the applications software by the user is higher than the predetermined usage level. Or, if an amount of the information input by the user per an hour to this applications software is more than a predetermined information amount, then it is determined that the usage level of the applications software by the user is higher than the predetermined usage level. Or, if an amount of the information processed by this applications software per an hour is more than a predetermined information amount, then it is determined that the usage level of the applications software by the user is higher than the predetermined usage level. Or, if the user uses a special feature of this applications software, then it is determined that the usage level of the applications software by the user is higher than the predetermined usage level. Whether the usage level of the applications software by the user is higher than the predetermined usage level can also be determined with any combinations of the above determining methods, its variants or other methods. It must be done to know who uses applications software: beginner or professional user.

If the usage level of the applications software 2 by the user is not higher than the predetermined usage level ("No" in Step S302), it is then determined that this user is a beginner (Step 310), and the smart card (or other information sources) is read to obtain a price which is specified by the recognized software developer or vendor, for a beginner at Step S311. Then, at Step S312, the available time period is determined on the basis of the payment of the user (Step S104) and the price for a beginner (Step S311). If the usage level of the applications software 2 by the user is higher than the predetermined usage level ("Yes" in Step S302), it is then determined that this user is an advanced user (Step 320), and the smart card (or other information sources) is read to obtain a price which is specified by the recognized software developer or vendor for an advanced user at Step S321. Then, at Step S322, the available time period is determined on the basis of the payment of the user (Step S104) and the price for an advanced user (Step S321).

In particularly, if the user pays a usage fee of $100 at Step S104 and is determined as a beginner in accordance with a usage time period less or equal to 1000 hours, and thereby a price for a beginner, $0.1 per hour, is obtained from the recognized software developer or vendor, then the available time period determined in Step S312 is $100÷$0.1/hour=1000 hours. If the usage time period is larger than 1000 hours, then the user is determined as an advanced user, and thereby a price for an advanced user, $0.5 per hour, is obtained from the recognized software developer or vendor, and thus the available time period determined in Step S322 is $100÷$0.5/hour=200 hours.

Returning to FIG. 1, at Step S106, the user is allowed to use the protected applications software 2 normally. After a predetermined time period, or at a predetermined moment, Step S 107 is performed to check whether the used time period is larger than the available time period determined in Step S105. If the used time period is not larger than the available timer period ("No" in Step S107), the user then is still allowed to use the protected applications software 2 normally (Step S106). If the used time period is larger than the available time period ("Yes" in Step S107), it goes to Step S108 to prompt the user to make the payment once more. And then, it is determined at Step S104 whether the user has already performs the off-line/on-line payment or not. When it is determined that the user does not perform a payment process ("No" in Step S104), it proceeds to Step S109 to terminate the execution of the protected applications software and to display an error message, and then it is ended at Step S110.

According to the present invention any operations like opening, editing, copying, moving, deleting, etc. of any installed files can be processed by data storage device controller only.

Additionally, the data storage device controller controls activity of all devices, such as card reader, etc., which will be used by user to perform the payment with credit cards, debit cards, smart cards, etc, Furthermore, the data storage device controller must independently perform the payment by using credit cards, debit cards, smart cards, etc, without involving of any systems or applications software.

Above, the present invention has been described referring to FIGS. 1-4. However, as it is known by those skilled in the art, the present invention can be embodied as hardware, software, firmware, middleware and other forms.

Furthermore, as is known today, there are many types of the files which are used by users and developers and which must be protected, such as *.exe, *.bat, *.com, script files, *.txt, *.doc, *.wav, etc. So, before opening or launching of any types of files the data storage device controller 9 must check it whether it has to be paid or not.

To solve this question must be used some control file format, for example: *.cff. It is a sample of some general file format which must be used for distribution of protected files. Of course, it can be any other newly created file format and the present invention is not limited thereto.

The files which are not protected can be distributed in its usual format, like *.exe, *.bat, *.com, script files, *.txt, *.doc, *.wav, etc.

Data storage device controller 9 must check all files which are preinstalled or will be installed on data storage device 3.

If a developer wishes that his software (files) will be protected, he will convert it into *.cff format before he releases this software for public usage. The developer also must distribute the detailed information about software (files) so it will be available through networks (such as Internet, LAN, WAN) or from any other available sources (such as credit cards, debit cards, IC cards etc.). When it is transmitted through networks, the transmitted information may be encrypted by using any known or future encryption algorithms so as to prevent the transmitted detailed information from hacking during the network transmission.

In case *.cff file has to be opened, the data storage device controller 9 will convert *.cff file into its original file format, enable installation to begin on PRAR 1, and check the installation process as mentioned above (see FIG. 2). If the installation is incorrect or unsafe, the data storage device controller 9 will block it. On the other hand, if the installation is correct, the data storage device controller 9 will allow the Operating System 4 (see FIG. 4) to execute the original file only with/without permission to be launched, copied, changed, etc., according to the made payment and type of license.

The converting into and from *.cff format must be standardized. The converting into and from *.cff format must be processed by data storage device controller 9 only.

During the converting of any types of files into *.cff format, the data storage device controller must add digital watermarking to newly created *.cff file.

Furthermore, any operations like opening, editing, copying, moving, etc. of *.cff files must be processed by data storage device controller only. It must be so to avoid any illegal action (cracking) which can be applied to *.cff files.

Additionally, under the environment of the present invention, in a case where the user wants to install some patch to update or legally patch the applications software on PRAR 2, patching and further payment, usage, etc. will be allowed if.

The patch is provided by the same software developer, which releases current applications software.

The patch is provided by the different software developer, but he is a recognized software developer.

Patching and further payment, usage, etc. will be not allowed if the patch is provided by the unrecognized software developer.

Next time when applications software has to be paid, the controller will summarize information from recognized. software developer and information of the last patching so that the payment will be allowed.

The patching will be performed by the same way as common installation of the any other applications software. The data storage controller performs installation of the patch to PRAR 1 of the data storage device 3. The data storage controller 9 checks whether the patch is properly installed and not illegally modified or not. If the checking is successful, the data storage device controller 9 performs reinstallation of the patch from PRAR 1 to original directory of PRAR 2 (for example, C:\Program files\ . . . ). Otherwise, the data storage device controller 9 will delete the patch from the PRAR 1 of the data storage device 3 in case the checking, is unsuccessful.

In case user wishes develop and launch own software, or install software or some patch from unrecognized developer, the data storage controller 9 performs installation of the current software to PRAR 1 of the data storage device 3. The data storage controller 9 checks whether the installed files are properly installed and not illegally modified or not. If the installed files are not protected and has not to be paid, the data storage device controller 9 performs reinstallation of the patch from PRAR 1 to UNAR (for example, C:\Program files\ . . . or D:\Program files\ . . . , etc.). Otherwise, the data storage device controller 9 will ask for payment or delete the installed files from the PRAR 1 of the data storage device 3.

Before the user begins the installation or launching of software from unrecognized developer, the user must receive and install the up to date list of protected software (files) with detailed information about these files, through networks (such as Internet, LAN, WAN) or from any other available sources (such as credit cards, debit cards, IC cards etc.) to data storage device controller 9. When it is transmitted through networks, the transmitted information may be encrypted by using any known or future encryption algorithms so as to prevent the transmitted detailed information from hacking during the network transmission.

The data storage device controller 9 must realize some strong restrictions to software installed on UNAR—it must have no any access to PRAR 1 and PRAR 2.

In summary, with reference to FIG. 4, the data storage device controller 9 converts *.cff files into their original formats *.exe, *.doc, etc. The data storage device controller 9 installs the software to the PRAR 2 or UNAR. The user can use the files according to his made payment and software license terms. The user can patch installed on PRAR 2 software by patch from a recognized software developer only. The user can patch installed on UNAR software by patch from unrecognized software developer only. The user can install the software from unrecognized software developer to UNAR. The installed on UNAR software has no any access to PRAR 1 and PRAR 2.

It has to be also noted that all the information described in the present document may be appropriately encrypted, especially when it will be transmitted through networks. All the encryption and decryption algorithms have to be known and easily implemented by those skilled in the art. Since the innovation of the present invention is not focusing on this aspect, the detailed descriptions about them are omitted.

It has to be also noted that here applications software was used as a sample to explain proposed protection method. It is understood by those skilled in the art that the proposed protection method can be used to protect any files (software) which can be stored on data storage device.

The present invention can also be realized as computer-executable instructions in computer-readable media. The computer-readable media includes all possible kinds of media in which computer-readable data is stored or included or can include any type of data that can be read by a computer or a processing unit. The computer-readable media include for example and are. not limited to storing media, such as magnetic storing media (e.g., ROMs, floppy disks, hard disk, and the like), optical reading media (e.g., CD-ROMs (compact disk-read-only memory), DVDs (digital versatile disks), re-writable versions of the optical disks, and the like), hybrid magnetic optical disks, organic disks, system memory (read-only memory, random access memory), non volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

Examples of methods for preventing illegal use of software are described throughout this application and include the following specific examples.

1. A method for preventing illegal use of software, comprising:

checking, by a data storage device controller, whether the software is properly installed and not illegally modified on a data storage device;

blocking, by the data storage device controller, a launch of the software, if the software is not properly installed or illegally modified on the data storage device;

checking, by the data storage device controller, whether the software has to be paid for use, if the software is properly installed and not illegally modified on the data storage device;

allowing the user to use the software normally, if the software is free for use;

checking, by the data storage device controller, whether a user has already performed a payment process, if the software has to be paid for use;

blocking, by the data storage device controller, the launch of the software, if the user does not perform the payment process;

determining an available time period of the software usage for each user of the current personal computer in a case the user has already made the payment, and allowing the user to use the software normally;

prompting the user to perform the payment process once more in a case of the used time period longer than the determined available time period; and terminating, by the data storage device controller, an execution of the software, if the user does not perform the payment process in time.

2. The method for preventing illegal use of software according to Item 1, wherein the data storage device controller will dedicate and manage two dedicated area on the data storage device, in which a first dedicated area contains two sub-dedicated area: a first sub-dedicated area is used for isolated checking, by a data storage device controller, whether the software is properly installed and not illegally modified; and a second sub-dedicated area is used: for final installing of software from recognized developers; and a second dedicated area is used for final installing of software from unrecognized software developers.

3. The method for preventing illegal use of software according to Item 2, wherein the first dedicated area will be kept permanently encrypted by the data storage device controller.

4. The method for preventing illegal use of software according to Item 2, wherein the data storage device controller provides restrictions to software installed on the second dedicated area without any access to the first dedicated area.

5. The method for preventing illegal use of software according to Item 1, wherein the step of checking whether the software properly installed and not illegally modified can be processed by the following two ways:

checking the software during its installation process; and/or checking the files of the already installed software before the software will be paid.

6. The method for preventing illegal use of software according to Item 5, wherein if the checking is performed during the installation process of the software, the step of checking whether the software is properly installed and not illegally modified comprises the following sub-steps:

installing, by the data storage device controller, the software to the first sub-dedicated area of the data storage device;

checking, by the data storage device controller, the data storage device to obtain detailed information about the installed software;

obtaining, by the data storage device controller, detailed information about the software which is provided by a recognized software developer;

comparing the detailed information obtained from the data storage device with the detailed information which is provided by the recognized software developer;

determining that the software has been properly installed and not illegally modified on the data storage device if a result of the above comparison is that the obtained two pieces of detailed information are the same; otherwise, determining that the software is not properly installed or illegally modified on the data storage device, if the result of the above comparison is that the obtained two pieces of detailed information are different; and reinstalling, by the data storage device controller, the software from the first sub-dedicated area of the data storage device to the second sub-dedicated area or to the second dedicated area of the data storage device; otherwise, deleting, by the data storage device controller, the installed software from the first sub-dedicated area of the data storage device.

7. The method for preventing illegal use of software according to Item 5, wherein the step of checking whether the already installed software is properly installed and not illegally modified comprises the following sub-steps:

checking, by the data storage device controller, the data storage device to obtain detailed information about the installed software;

obtaining, by the data storage device controller, detailed information about the software which is provided by a recognized software developer;

comparing the detailed information obtained from the data storage device with the detailed information which is provided by the recognized software developer; and determining that the software has been properly installed and not illegally modified on the data storage device if a result of the above comparison is that the obtained two pieces of detailed information are the same; otherwise, determining that the software is not properly installed or illegally modified in the data storage device if the result of the above comparison is that the obtained two pieces of detailed information are different.

8. The method for preventing, illegal use of software according to any one of Items 5 to 7, wherein the data storage device controller obtains the detailed information about the software provided from a recognized software developer by means of credit cards, debit cards, smart cards, IC cards, Internet or networks.

9. The method for preventing illegal use of software according to Item 8, wherein the detailed information is always encrypted, especially when the detailed information is transmitted through Internet or networks.

10. The method for preventing illegal use of software according to any one of Items 1-9, wherein the data storage device controller controls directly all devices which are used to obtain the detailed information about the applications software provided from a recognized software developer by means of credit cards, debit cards, smart cards, IC cards, Internet or networks.

11. The method for preventing illegal use of software according to any one of Items 1-10, wherein the data storage device controller must independently process the obtaining of the detailed information about application software by using credit cards, debit cards, smart cards, IC cards, Internet or networks, without involving of any systems or applications software.

12. The method for preventing illegal use of software according to Item 1, wherein the step of determining the available time period of the software comprises following sub-steps:

gathering information about a usage level of the software;

determining whether.—the current usage level of the software is higher than a basic usage level predetermined by a software developer or a vendor;

determining the available time period on the basis of a fee paid by the user and a first price, if the usage level is not higher than the predetermined basic level; and determining the available time period on the basis of a fee paid by the user and a second price, if the usage level is higher than the predetermined basic level.

13. The method for preventing illegal use of software according to Item 12, wherein the usage level of the software is determined according to at least one of:

total usage time period;
daily usage time period;
total amount of input information;
total amount of processed information;
used features of the software.

14. The method for preventing illegal use of software according to any one of Items 12-13, wherein:

in a case the total or daily usage time period is longer than a predetermined basic time period, it is determined that the usage level of the software is higher than the predetermined basic usage level; or in a case where the total amount of inputted information is more than a predetermined basic information amount, it is determined that the usage level of the software is higher than the predetermined basic usage level; or in a case where the total amount of processed information is more than a predetermined basic information amount, it is determined that the usage level of the software is higher than the predetermined basic usage level; or in a case where a special feature of the software is used, it is determined that the usage level of the software is higher than the predetermined basic usage level.

15. The method for preventing illegal use of software according to any one of Items 12-14, wherein the first and the second prices are obtained by means of credit cards, debit cards, smart cards, IC cards or networks.

16. The method for preventing illegal use of software according to Item 15, wherein information related to the first and the second prices is always encrypted, especially when the information related to the first and the second prices is transmitted through networks.

17. The method for preventing illegal use of software according to any one of Items 1-16, wherein the recognized software developer releases his software in a control file format—*.cff format with digital watermarking.

18. The method for preventing illegal use of software according to Item 1, further comprising, before the step of checking whether the software is properly installed:

converting, by the data storage device controller, *.cff files into their original file formats; and enabling the installation to begin to the first sub-dedicated area for the recognized software developer.

19. The method for preventing illegal use of software according to any one of Items 1-18, wherein the data storage device controller controls all data storage devices of PC: hard disk, compact disk (CD), digital versatile disk (DVD), floppy disk, magnetic tape, flash memory, ZIP disk, network memory.

20. The method for preventing illegal use of software according to any one of Items 1-19, wherein activities of the data storage device controller are independent from any other device or software, and the data storage device controller controls directly all devices which can be a source to launch and execute the software.

21. The method for preventing illegal use of software according to any one of Items 1-20, wherein any operations like opening, editing, copying, moving, deleting of any files/software must be processed by the data storage device controller only.

22. The method for preventing illegal use of software according to any one of Items 1-21, wherein the data storage device controller is an integrated important constitutive element of the motherboard, once it is illegally replaced or intruded, the computer motherboard will be broken down.

23. The method for preventing illegal use of software according to Item 1, wherein the user performs the payment process in an off-line payment manner or in an on-line payment manner.

24. The method for preventing illegal use of software according to Item 1, wherein the data storage device controller controls activity of all devices, especially card reader, which will be used by user to perform the payment with credit cards, debit cards, smart cards.

25. The method for preventing illegal use of software according to Item 1, wherein the data storage device controller will independently perform the payment by using credit cards, debit cards, smart cards, without involving of any systems or applications software.

Although embodiments of the present invention have been disclosed for illustrative purposes, those skilled in the art appreciate that various modifications, additions and substitutions are possible, without departing from the scope and spirit of the disclosure and the invention. Therefore, the present invention is not to be intended to be limited to the above exemplary embodiments but to be limited by the accompanying claims.

What is claimed is:

1. A non-transitory computer storage medium encoded with a computer program for preventing illegal use of software, the program comprising instructions that when executed by data processing apparatus of a data storage device controller cause the data processing apparatus to perform operations comprising:

checking whether the software is properly installed and is not illegally modified on a data storage device;

if the software is not properly installed or is illegally modified on the data storage device then blocking a launch of the software;

if the software is properly installed and is not illegally modified on the data storage device then checking whether the software has to be paid for use;

if the software is free for use then allowing a user to use the software normally;

if the software has to be paid for use then checking whether a user has already performed a payment process;

if the user has not performed the payment process then blocking the launch of the software;

if the user has already made the payment then determining an available time period of software usage for each user of a current personal computer, wherein said determining the available time period of the software comprises gathering information about a usage level of the software;

determining whether a current usage level of the software is higher than a predetermined usage level predetermined by a software developer or a vendor;

determining the available time period on the basis of a fee paid by the user and a first price, if the usage level is not higher than the predetermined usage level; and determining the available time period on the basis of a fee paid by the user and a second price, if the usage level is higher than the predetermined usage level;

if the software has been used for a period of time that is less than the determined available time period then allowing the user to use the software normally;

if the software has been used for a period of time that is longer than the determined available time period then prompting the user to perform the payment process once more; and terminating an execution of the software, if the user does not perform the payment process once more in response of said prompting.

2. The computer storage medium according to claim 1, wherein the operations further comprise:

determining the usage level of the software according to at least one of:

a total usage time period;

a daily usage time period;

a total amount of input information;

a total amount of processed information; and used features of the software.

3. The computer storage medium according to claim 2, wherein the operations further comprise:

in a case the total or daily usage time period is longer than a predetermined usage time period, marking the usage level of the software as being higher than the predetermined usage level; or in a case where the total amount of inputted information is more than a predetermined information amount, marking the usage level of the software as being higher than the predetermined usage level; or in a case where the total amount of processed information is more than a predetermined information amount, the usage level of the software is marked as being higher than the predetermined usage level; or in a case where a special feature of the software is used, marking the usage level of the software as being higher than the predetermined usage level.

* * * * *